United States Patent [19]
Breuer et al.

[11] Patent Number: 5,502,433
[45] Date of Patent: Mar. 26, 1996

[54] METHOD AND DEVICE FOR DETECTING HYDROPLANING CONDITIONS FOR VEHICLE TIRES

[75] Inventors: Bert Breuer, Seeheim-Jugenheim; Jörg Stöcker, Mühltal-Trautheim; Jürgen Roth, Sailauf, all of Germany

[73] Assignee: Continental Aktiengesellschaft, Hanover, Germany

[21] Appl. No.: 169,114

[22] Filed: Dec. 17, 1993

[30] Foreign Application Priority Data

Dec. 17, 1992 [DE] Germany ............ 42 42 726.6
Oct. 21, 1993 [DE] Germany ............ 43 35 938.8

[51] Int. Cl.⁶ ............................................. B60Q 1/00
[52] U.S. Cl. .................... 340/438; 340/442; 340/602; 364/424.03; 280/757; 180/197; 180/271; 152/210; 73/146
[58] Field of Search .................... 340/438, 442, 340/445, 602; 364/426.01, 426.02, 426.03; 280/757; 180/197, 271; 152/209 R, 208, 210; 73/146, 146.4, 146.5

[56] References Cited

U.S. PATENT DOCUMENTS

| 4,095,464 | 6/1978 | Breedijk ........................ 73/146 |
| 5,032,821 | 7/1991 | Domanico et al. .......... 340/438 |
| 5,350,035 | 9/1994 | Bodier et al. ............... 180/271 |

FOREIGN PATENT DOCUMENTS

| WO9108129 | 6/1991 | European Pat. Off. . |
| 3937966 | 5/1991 | Germany . |

Primary Examiner—Donnie L. Crosland
Attorney, Agent, or Firm—Robert W. Becker & Associates

[57] ABSTRACT

In a method for detecting a hydroplaning risk for vehicle tires the sequential deformations of tread elements of the vehicle tire in the circumferential direction during contacting the road surface are measured. A sequence of corresponding signals is generated. The sequence of corresponding signals is processed to produce processed signals. The processed signals are compared to predetermined evaluation standards, and a warning signal for indicating the imminent danger of hydroplaning is sent as a function of the predetermined standards.

13 Claims, 7 Drawing Sheets

METHOD AND DEVICE FOR DETECTING HYDROPLANING CONDITIONS FOR VEHICLE TIRES

BACKGROUND OF THE INVENTION

The present invention relates to a method for detecting hydroplaning conditions for vehicle tires as well as a device for performing the inventive method.

Hydroplaning, i.e., the loss of contact of the vehicle tire with the road surface due to formation of a film of water, represents a considerable danger for operating a vehicle. A special danger lies in the fact that hydroplaning occurs without warning signs that are detectable by the driver.

The required friction for transferring braking, acceleration, and lateral guiding forces between the vehicle tire and the road surface is only provided in a sufficient amount when the vehicle tire during rolling on a road surface having a water film thereon is able to displace this water film at least to a substantial portion of the contact surface (the flattened surface of the tire in contact with the road surface during driving, also conventionally referred to as "contact patch" or "contact zone") of the tire so that in this area a direct contact between vehicle tire and road surface is ensured. This displacement of the water film occurs in part due to the drainage properties of the road surface and in part due to the drainage properties of the negative tread portions of the vehicle tire. Since the amount of water that can be displaced by drainage per time unit by the contact of the tire is limited, a so-called water wedge is formed at the leading edge of the contact surface of the tire with increasing vehicle velocity and as a function of the water level. The more the velocity increases, the farther the water wedge is forced under the contact surface of the tire. The horizontal forces which are required for a safe vehicle operation can then be transferred only within the rearward portion of the contact surface of the tire that has not yet been affected by the water wedge.

Upon further insertion of the water wedge between the contact surface of the tire and the road surface, the actual contact area is reduced between the tire and the road surface. In the end, the vehicle tire skids on the hydrodynamic water film. In this state, which is called hydroplaning, horizontal forces can no longer be transmitted. Due to the loss of the lateral guiding forces and of possible braking forces, the vehicle is no longer controllable in this state.

Since the driver becomes aware of the danger of hydroplaning during steering only after the loss of lateral guiding forces, the possibility of a prewarning is practically non-existent. The driver is only able to generally estimate whether the danger of hydroplaning is present due to the presence of a water film on the road surface and as a function of the respective speed of the vehicle.

It is therefore an object of the present invention to provide a method of the aforementioned kind with which the imminent danger of hydroplaning can be detected at an early stage.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

A first method for detecting a hydroplaning risk for vehicle tires according to the present invention is primarily characterized by:

Measuring sequential deformations of tread elements of the vehicle tire in a circumferential direction during contacting a road surface and generating a sequence of corresponding signals;

Processing the sequence of corresponding signals to produce processed signals;

Comparing the processed signals to predetermined evaluation standards; and

As a function of the predetermined evaluation standards i.e. depending on the predetermined evaluation standards, sending a warning signal for indicating the danger of hydroplaning.

Preferably, the method further comprises the steps of producing a standard sequence of signals for the sequential deformations on a dry road surface as the predetermined standards, comparing the processed signals to the standard sequence of signals, and sending the warning signal when the processed signals surpass a predetermined deviation relative to the standard sequence of signals.

Advantageously, the inventive method further comprises the steps of determining a slope of the processed signals at a center of a positive impulse, and sending the warning signal when the slope is below a preset value.

Expediently, the method further comprises the steps of differentiating the sequence of corresponding signals to produce a first derivative, and comparing an amplitude of the first derivative within the center of the positive impulse to the preset value.

The warning signal may be an optical and/or an acoustic signal.

In a preferred development of the present invention, the inventive method further comprises the step of activating an active safety system of the vehicle with the warning signal.

According to another embodiment of the present invention, the method for detecting a hydroplaning risk for vehicle tires is primarily characterized by the following steps:

Measuring sequential deformations of tread elements of the vehicle tire in a circumferential direction during contacting a road surface and generating a sequence of corresponding signals;

Differentiating the sequence of corresponding signals to produce a first derivative;

Determining a minimum of an amplitude of the first derivative at a centrally located third of a positive impulse of the sequence of corresponding signals; and Sending a warning signal for indicating the imminent danger of hydroplaning, when the minimum is below a preset threshold value.

Preferably, the minimum of the derivative is determined in an area that corresponds to the first two thirds of the positive impulse. Expediently, the warning signal may be an optical and/or acoustic signal.

Preferably, the second method further comprises the step of activating an active safety system of the vehicle with the warning signal.

In another preferred embodiment of the present invention the method preferably comprises the following steps:

Measuring sequential deformations of tread elements of the vehicle tire in a circumferential direction during contacting a road surface and generating a sequence of corresponding signals;

Computing a characteristic value from the sequence of corresponding signals (x signals) according to the following conditions:
  a) when two local maxima of the sequence of corresponding signals are present, the characteristic value is a quotient between a temporally first maximum and a temporally second maximum;
  b) when a number of maxima of the sequence of corresponding signals is other than two, the characteristic value is zero;

Comparing the characteristic value to a preset threshold value; and

Sending a warning signal for indicating the imminent danger of hydroplaning, when the characteristic value is greater than the preset threshold value.

The present invention is further concerned with a device for detecting the imminent danger of hydroplaning for vehicle tires, wherein the sequential deformation of tread elements of the vehicle tire in a circumferential direction during contacting of a road surface is measured and a sequence of corresponding signals is generated, this sequence is processed to produce processed signals, the processed signals are compared to predetermined evaluation standards, and, as a function of the predetermined evaluation standards, a warning signal for indicating the imminent danger of hydroplaning is sent; the device according to the present invention comprising:

A processing unit;

A sender embedded in at least one tread element of a vehicle tire; and

A plurality of receivers positioned at an inner surface of the vehicle tire or on the rim for detecting distance variations between the sender and the receiver, the receivers sending a signal, describing the deformation of the tread element in the circumferential direction, to the processing unit.

Preferably, the sender is a permanent magnet and the receivers are Hall generators.

In another preferred embodiment of the present invention, the device for detecting a hydroplaning risk for vehicle tires, wherein sequential deformations of tread elements of the vehicle tire in a circumferential direction during contacting a road surface are measured and a sequence of corresponding signals is generated, this sequence is differentiated to produce a first derivative, a minimum of an amplitude of the first derivative at a centrally located third of a positive impulse of the sequence of corresponding signals is determined, and a warning signal for indicating the imminent danger of hydroplaning is sent, when the minimum is below a preset threshold value; the device comprising:

A processing unit;

A sender embedded in at least one tread element of the vehicle tire; and

A plurality of receivers positioned at an inner surface of the vehicle tire or on the rim for detecting distance variations between the sender and the receivers, the receivers sending a signal, describing the deformation of the tread element in the circumferential direction, to the processing unit.

Advantageously, the sender is a permanent magnet and the receivers are Hall generators.

According to the gist of the present invention, the sequence of signals resulting from the tread element deformation is processed and a warning signal is emitted as a function of preset evaluating criteria to indicate the imminent danger of hydroplaning.

According to a first embodiment of the present invention, the deformation of tread elements of the vehicle tire in the circumferential direction upon contacting the road surface (passing through the contact surface) is measured, the slope of the resulting sequence of corresponding signals is determined substantially in the center of the positive impulse of the resulting signal course, and a warning signal is released that indicates the danger of hydroplaning when the determined slope value is below a predetermined threshold value. According to a second embodiment of the invention the minimum of the derivative in an area that corresponds to the first two thirds of the positive impulse of the signal course is determined.

In a third embodiment of the present invention the sequence of signals in the circumferential direction (x signal) is used to calculate a characteristic value KA which, when surpassing a certain threshold value, releases the warning signal indicating imminent hydroplaning danger. The characteristic value KA is defined as the quotient of the height of the first local maximum of the x signal divided by the height of the second local maximum of the x signal when two local maxima are present. When the number of local maxima is not two, then KA equals zero. The resulting KA value is then compared to a preset threshold value and, if the threshold value is surpassed, a warning signal is released (emitted).

With the present invention it has been recognized for the first time that the deformation behavior of tread elements in the contact surface of the tire, i.e., the area of the tire that contacts the road surface and is essentially flattened, may provide data relevant to the formation of a water wedge already under driving conditions in which there is still sufficient friction due to correct contact between the vehicle tire and the road surface so that the driver at this point cannot detect any changes in the performance of the vehicle.

When with the inventive method it is determined that the temporal course of the deformation of the tread elements of the vehicle tire upon contacting the road surface has been substantially changed in a certain typical fashion, especially in comparison to the temporal deformation course that has been determined for a dry road surface, a signal is released that indicates to the driver that the danger of hydroplaning is present. The driver then knows that upon increasing the speed of the vehicle and/or upon increase of the thickness of the water film on the road surface hydroplaning may most likely occur. Accordingly, the driver can adapt his driving behavior. Instead, or in addition, an active safety system of the vehicle may be activated, for example, for reducing the speed of the vehicle. According to a further embodiment of the invention it is suggested that the sequence of signals is compared to a predetermined course (sequence) of signals resulting from measurements on a dry road surface and that upon surpassing a predetermined deviation from the dry road signal sequence the warning signal is emitted.

According to another embodiment of the present invention the deformation of the tread element of the vehicle tire in the circumferential direction upon contact with the road surface is determined; subsequently, the slope of the signal course of the sequence of signals is determined substantially in the center of the positive impulse of the determined signal course and a warning signal, indicating the imminent danger of hydroplaning, is released when the determined slope value is below a predetermined threshold value. According to a further embodiment of the invention the minimum of the derivative is determined in an area that comprises the first two thirds of the positive impulse of the course of the signals.

The section of the measured signal course that is referred to as "positive impulse" corresponds, as a matter of definition, to the deformation of the tread element at the leading edge of the contact surface (zone) counter to the rotational direction of the tire.

It is known from German Offenlegungsschrift 39 37 966 to embed senders into the tread elements of a vehicle tire wherein distance changes to receivers provided at the inner side of the vehicle create a signal that corresponds to the deformation of the tread element. However, the resulting signals have not been used for determining the danger of hydroplaning.

DESCRIPTION OF PREFERRED EMBODIMENTS

The present invention will now be described in detail with the aid of several specific embodiments utilizing FIGS. 1 through 7.

Figure 1:
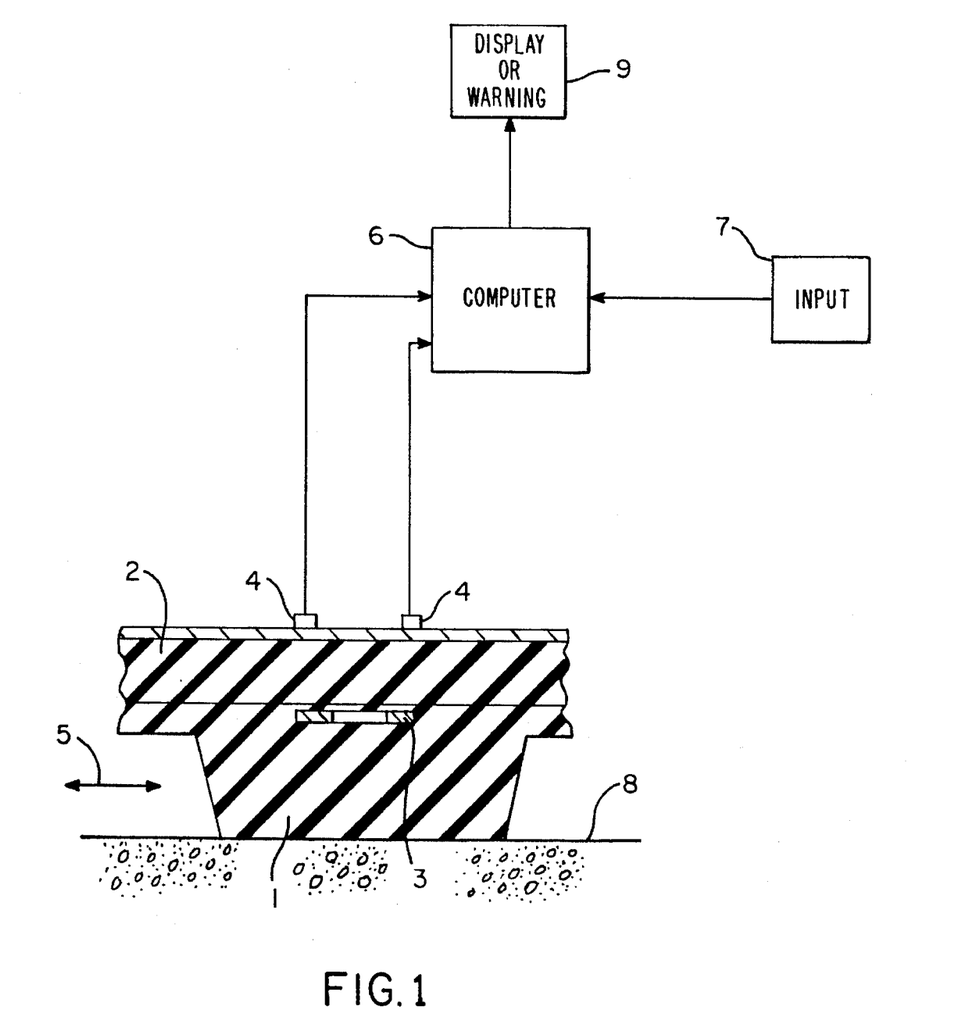
FIG. 1 is a schematic representation of a sectional view of a portion of the tire tread in contact with the road surface showing schematically a processing device.

As shown in FIG. 1, a sender 3 is embedded in a tread element (tread lug) 1 of a pneumatic vehicle tire. On the inner side of the tire receivers 4 in the form of at least two Hall generators are provided which detect distance changes to the sender 3.

When the tread element 1 upon contacting the road surface in the circumferential direction of the vehicle tire 2, indicated by double-headed arrow 5, is deformed, distance changes between the permanent magnet 3 and the Hall generators 4 result. These distance changes produce a signal (x signal) within the processing unit 6 that is only schematically represented in FIG. 1. This signal corresponds to the distance changes and thus to the deformation of the tread element 1 in the circumferential direction.

In the processing unit 6, which is embodied as a computer, the positive impulse of the thus determined sequence of signals for the tread element deformation at the leading edge of the contact area of the tire counter to the rotational tire direction is determined. In the center of this positive impulse the slope of the sequence of signals is determined, i.e., a tangent is placed at the curve of the signals. The slope of this tangent is a measure for the corresponding danger of hydroplaning. Accordingly, the slope value determined at this location is compared to a threshold value that has been entered by an input device 7, and a warning signal indicating the danger of hydroplaning is released when the determined slope value is below the threshold value.

The threshold value is selected such that the signal is released when the beginning formation of a water wedge between the contact surface of the vehicle tire 1 and the road surface 8 at the leading edge of the contact surface has progressed to such an extent that the danger of hydroplaning exists. The signal is sent to a display or warning device 9 and releases an optical and/or acoustic warning signal for the driver. In addition to, or independent of, such a warning signal it may also be provided that the signal activates an active safety system of the vehicle, for example, a control unit that reduces the speed of the vehicle.

Figure 2:
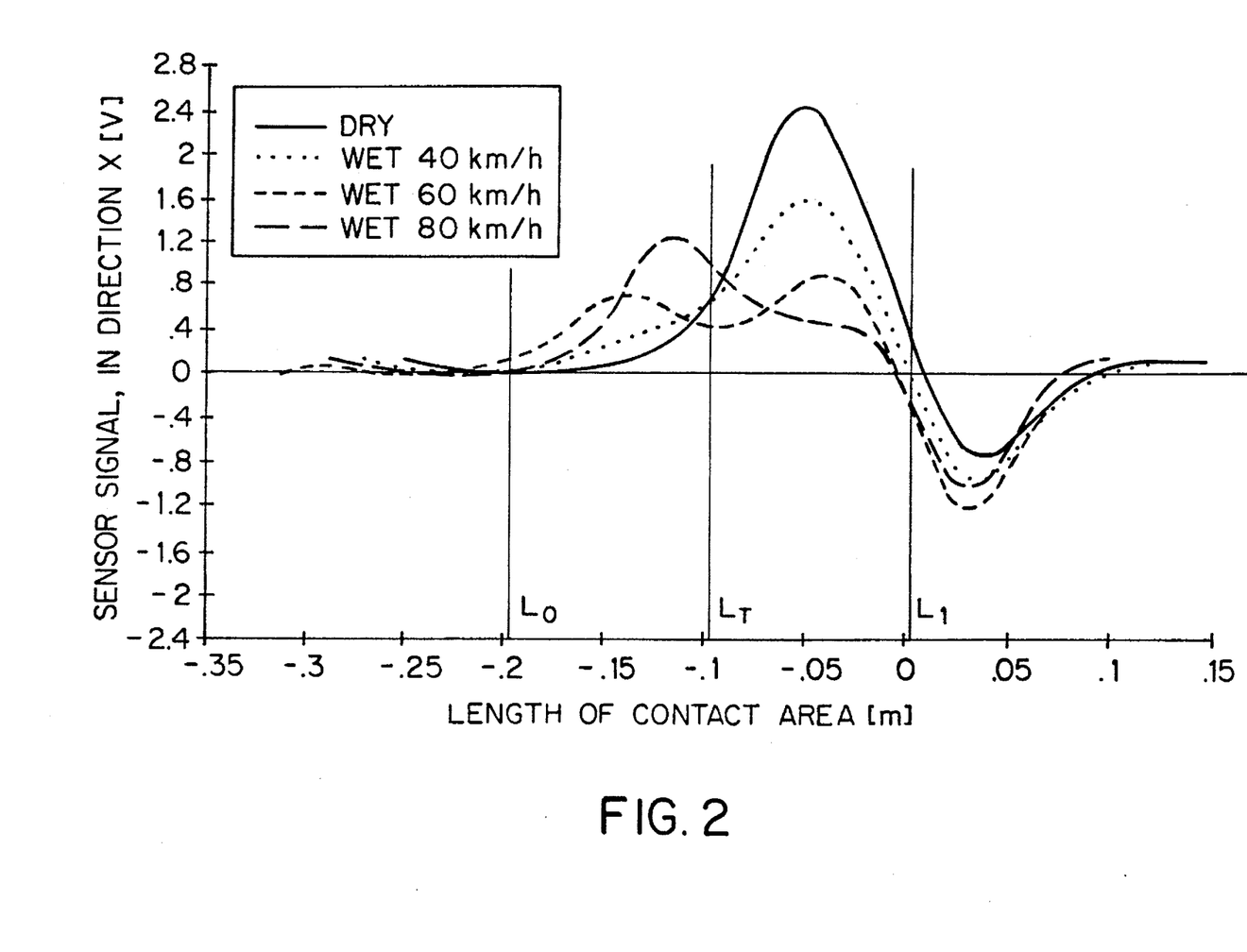
FIG. 2 shows a diagram of the deformation of a tread element upon contacting the road surface for the presence or absence of a water film on the road surface and at different velocities.

FIG. 2 shows the course of the signals that correspond to the deformation of a tread element upon contacting the road surface in the positive circumferential direction, i.e., counter to the rotational direction of the vehicle tire, whereby, in different dash-dotted lines, the sequences of signals for a dry road surface and for a water level of approximately 10 mm at different velocities are shown. The positive impulse extends from the beginning $L_0$ of the deformation to the zero position $L_1$ of the sequence of signals. At the center indicated at $L_T$ of the positive impulse, between $L_0$ and $L_1$, the tangent T is placed on the curve of the signals.

Figure 3:
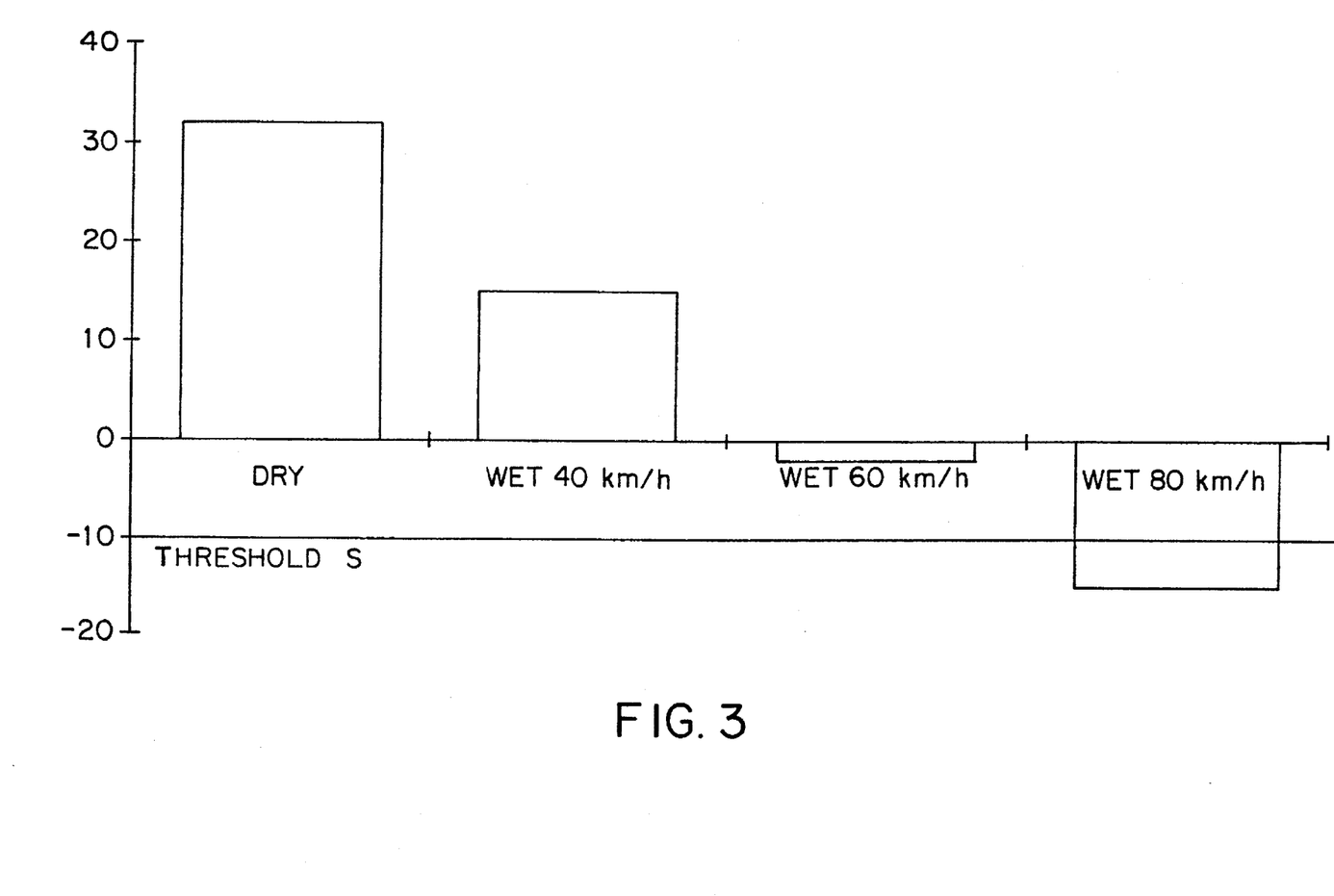
FIG. 3 shows a diagram that represents the slope of the tangent of the curve of FIG. 2.

The slope values of these tangents are represented in FIG. 3. Also indicated is the predetermined threshold value S. It is obvious that for the represented embodiment the slope of the tangent at the signal course for 80 km per hour and a wet road surface is below the threshold value S, i.e., in this scenario the danger of hydroplaning exists.

Figure 4:
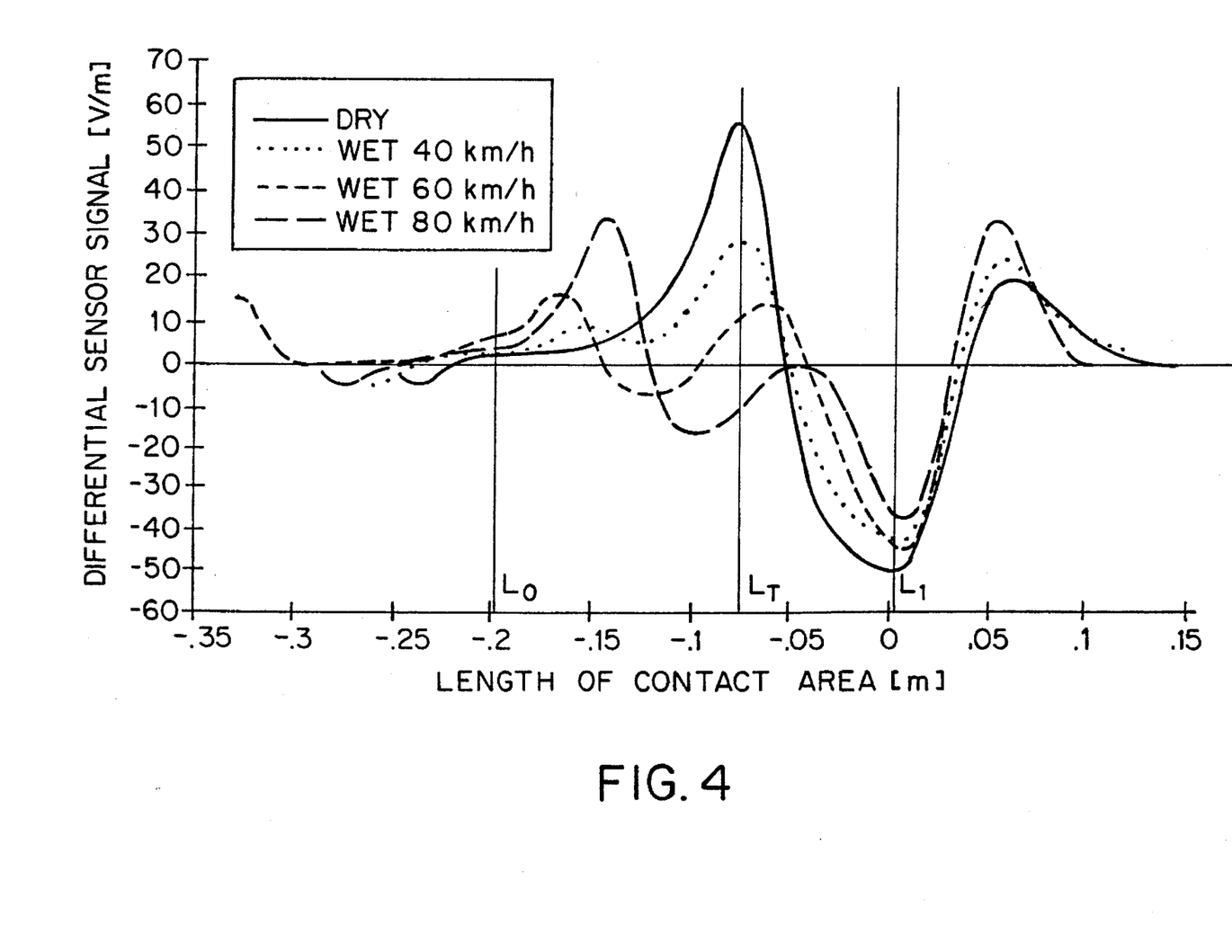
FIG. 4 shows a diagram of the derivative of the curve of diagram FIG. 2.
Figure 5:
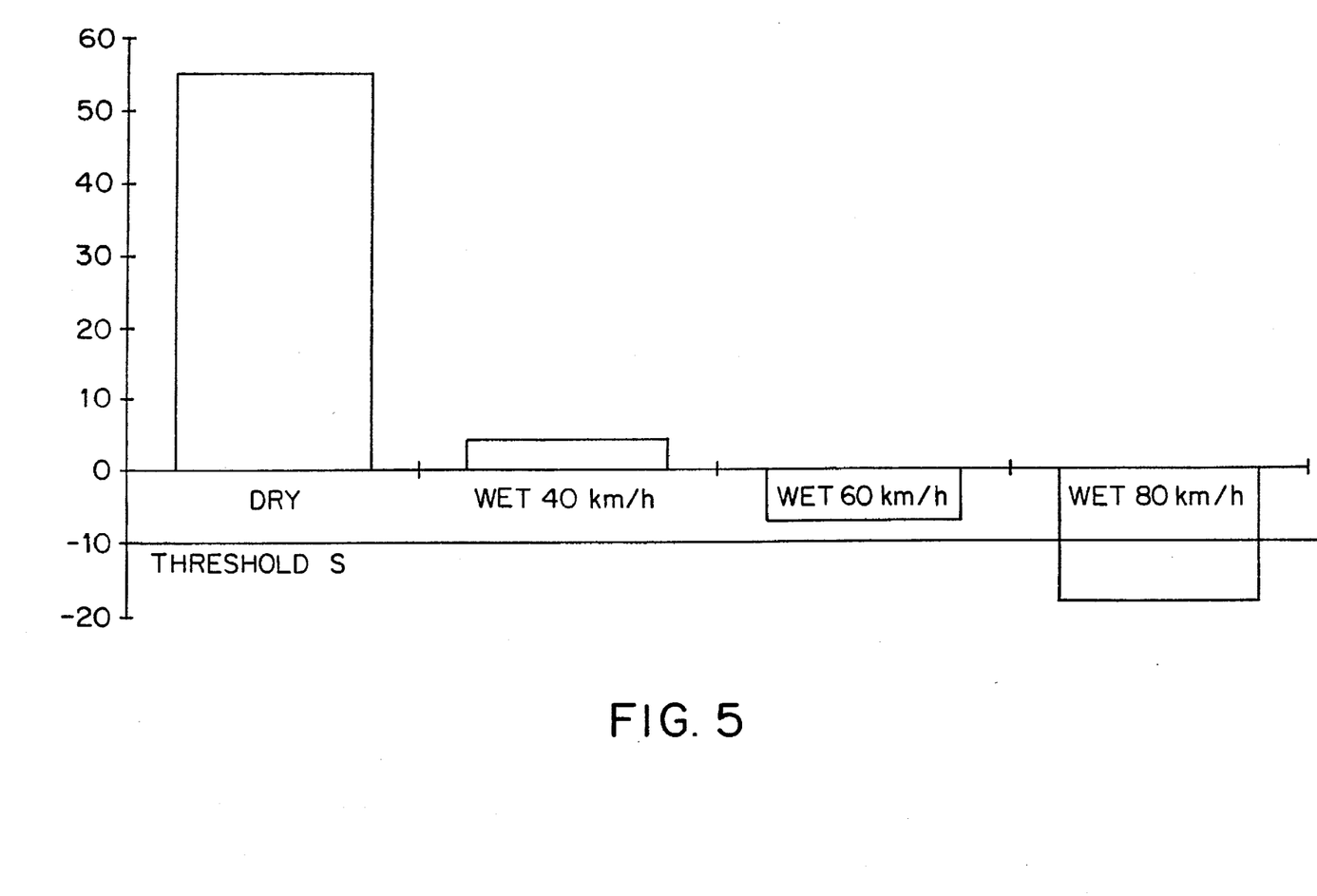
FIG. 5 is a diagram which represents the computed minima for the curve of FIG. 4.

As an alternative to the described example it may also be provided that in the processing unit 6 the measured temporal sequence of signals is mathematically differentiated, i.e., the first derivative of the sequence of signals is formed. These derivatives are represented in FIG. 4 for different road surface conditions and speeds. In an area that preferably corresponds to the first two thirds of the positive impulse of the sequence of signals (FIG. 2), the minimum of the amplitude of the derivative (FIG. 4) is determined. FIG. 5 shows these minima of the four signal courses of FIG. 4. It is shown that the minimum determined for a velocity of 80 km per hour on a wet road surface also is below the prescribed threshold value SA so that the device 9 releases a warning signal and/or activates an active safety system of the vehicle because of the imminent danger of hydroplaning.

It has been shown that the minima of the derivatives according to the last described method correspond substantially linearly to the velocity when road conditions are identical. These minima thus provide a direct measure for the magnitude of the hydroplaning danger.

In a third embodiment of the present invention, the sensor signals (x signals) are used to calculate a characteristic value KA that upon surpassing a certain threshold value releases a warning signal indicating the danger of hydroplaning.

When two local maxima of the sensor signals in the circumferential direction exist, the characteristic value KA corresponds to the quotient between the amplitude of the temporally first local maximum and the amplitude of the temporally second local maximum. When two local maxima do not exist, then the characteristic value KA is zero.

$$Ka = \frac{\text{amplitude of 1st local maximum of } x \text{ signal}}{\text{amplitude of 2nd local maximum of } x \text{ signal}}$$

(for 2 local maxima)

$Ka = 0$  (for local maxima $\neq 2$)

Figure 6:
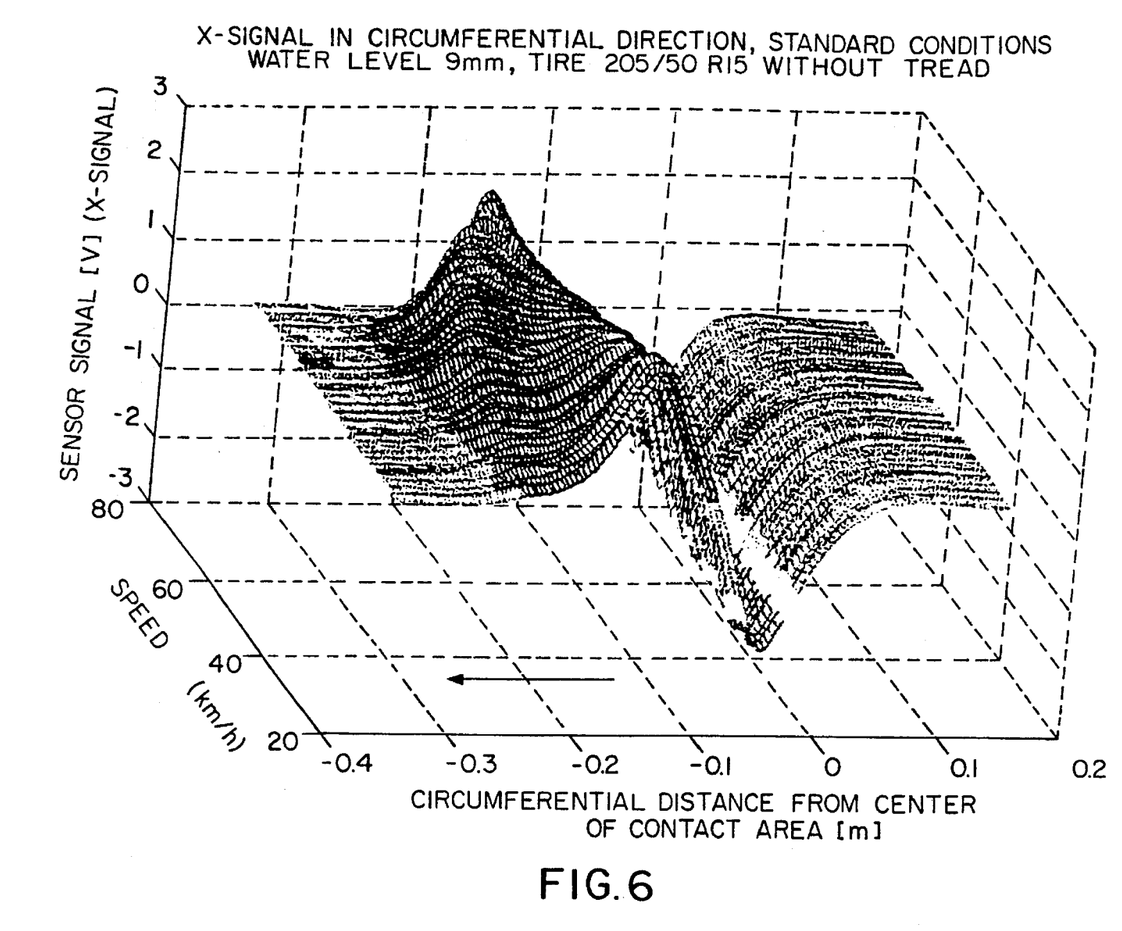
FIG. 6 shows a three-dimensional diagram of the sensor signal (X signal) during hydroplaning.

FIG. 6 shows the course of the signals representing the deformation of a tread element upon contacting the road surface in the positive circumferential direction, i.e., counter to the rotational direction of the vehicle tire, for a water level of 9 mm at varying velocities, plotted as a function of the circumferential distance from the center of the contact surface.

Figure 7:
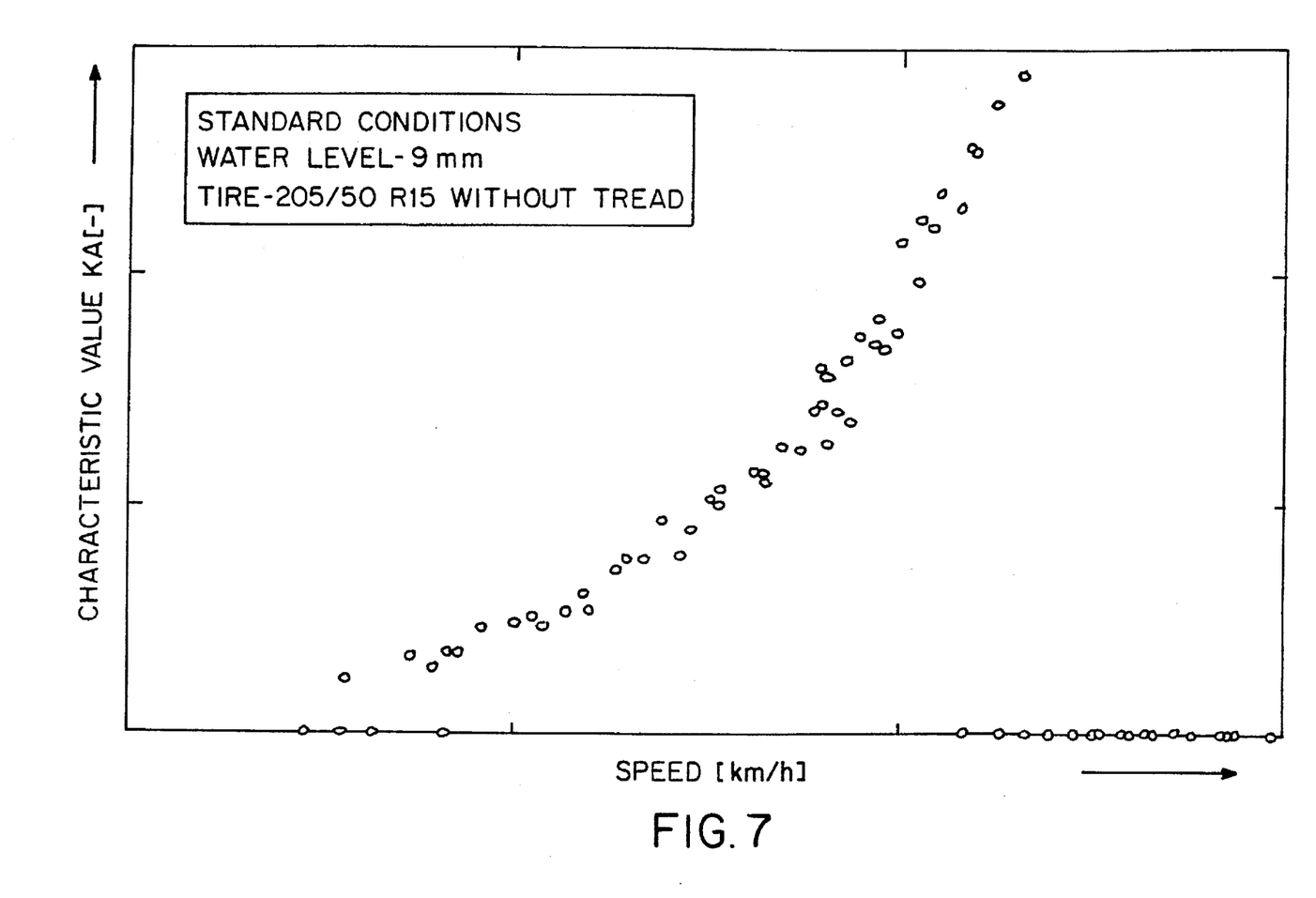
FIG. 7 shows a diagram of the computed characteristic value KA as a function of speed.

The characteristic values KA resulting from the computation are represented in FIG. 7 as a function of the velocity. The threshold value at which the characteristic value KA initiates a signal for indicating the danger of hydroplaning, is, for example, empirically determined.

The present invention is, of course, in no way restricted to the specific disclosure of the specification and drawings, but also encompasses any modifications within the scope of the appended claims.

What I claim is:

1. A method for detecting a hydroplaning risk for vehicle tires, said method comprising the steps of:

measuring continuously sequential deformations of tread elements of the vehicle tire in a circumferential direction over a circumferential length of the tread elements while passing through a contact zone of the vehicle tire and generating a sequence of corresponding signals, wherein said sequence of corresponding signals has a section, referred to as a positive impulse, wherein the deformations of the tread elements near a leading edge of the contact zone are counter to the direction of rotation;

differentiating the sequence of corresponding signals over the circumferential length to determine a slope near a center of the positive impulse;

comparing the slope to predetermined evaluation standards; and as a function of said predetermined evaluation standards, determining the danger of hydroplaning when said slope is below a preset value whereby a warning signal is generated.

2. A method according to claim 1, further comprising the steps of:

dividing the positive impulse into thirds;

differentiating over the circumferential length said sequence of corresponding signals at least within a centrally located third of the positive impulse to determine the slope;

determining a minimum of the slope at the centrally located third; and wherein said minimum is used as said preset value.

3. A method according to claim 2, wherein said minimum of the slope is determined in an area that corresponds to the first two of said thirds of said positive impulse.

4. A method according to claim 1, wherein the step of differentiating is carried out in a processing unit in the form of a computer.

5. A method according to claim 1, wherein said warning signal is an optical signal.

6. A method according to claim 1, wherein said warning signal is an acoustic signal.

7. A method according to claim 1, wherein said warning signal is an optical and an acoustic signal.

8. A method according to claim 1, further comprising the step of activating an active safety system of the vehicle with said warning signal.

9. A method according to claim 1, further comprising the steps of:

computing a characteristic value from said sequence of corresponding signals according to the following conditions:

a) when two local maxima of said sequence of corresponding signals are present, said characteristic value is a quotient between a temporally first maximum and a temporally second maximum;

b) when a number of maxima of said sequence of corresponding signal is other than 2, said characteristic value is zero;

comparing said characteristic value to a preset threshold value; and when said characteristic value is greater than said preset threshold value, indicating the danger of hydroplaning.

10. A device for detecting a hydroplaning risk for vehicle tires, wherein the sequential deformations of tread elements of the vehicle tire in a circumferential direction over a circumferential length of the tread elements while passing through a contact zone of the vehicle tire is measured continuously and a sequence of corresponding signals is generated, wherein said sequence of corresponding signals has a section, referred to as a positive impulse, wherein the deformations of the tread elements near the leading edge of the contact zone are counter to the direction of rotation, the sequence of corresponding signals is differentiated over the circumferential length to determine a slope near a center of the positive impulse, the slope is compared to predetermined evaluation standards, and, as a function of the predetermined evaluation standards, the danger of hydroplaning is determined, when said slope is below a preset value; said device comprising:

a processing unit;

a sender embedded in at least one tread element of a vehicle tire; and a plurality of receivers positioned at an inner surface of the vehicle tire for detecting distance variations between said sender and said receiver, said receivers sending a signal, describing the deformation of the tread element in the circumferential direction, to said processing unit.

11. A device according to claim 10, wherein said sender is a permanent magnet and said receivers are Hall generators.

12. A device for detecting a hydroplaning risk for vehicle tires, wherein a sequential deformations of tread elements of the vehicle tire in a circumferential direction over a circumferential length of the tread elements while passing through a contact zone of the vehicle tire is measured continuously and a sequence of corresponding signals is generated, wherein said sequence of corresponding signals has a section, referred to a positive impulse, wherein the deformations of the tread elements near the leading edge of the contact zone are counter to the direction of rotation, the sequence of corresponding signals is differentiated over the circumferential length to determine a slope near a center of the positive impulse, the slope is compared to predetermined evaluation standards, and, as a function of the predetermined evaluation standards, the danger of hydroplaning is determined, when said slope is below a preset value; said device comprising:

a processing unit;

a sender embedded in at least one tread element of a vehicle tire; and a plurality of receivers positioned on the rim for detecting distance variations between said sender and said receivers, said receivers sending a signal, describing the deformation of the tread element in the circumferential direction, to said processing unit.

13. A device according to claim 12, wherein said sender is a permanent magnet and said receivers are Hall generators.

* * * * *

UNITED STATES PATENT AND TRADEMARK OFFICE
CERTIFICATE OF CORRECTION

PATENT NO. : 5,502,433
DATED : March 26, 1996
INVENTOR(S) : Bert Breuer, et. al.

It is certified that error appears in the above-indentified patent and that said Letters Patent is hereby corrected as shown below:

Col. 7, claim 1, line 31, delete "warning";

Col. 7, claim 1, line 32, after "generating" insert -- for activating at least one safety device selected from the group consisting of a display device, a warning device, and an active safety system of the vehicle --.

Signed and Sealed this

Twenty-ninth Day of July, 1997

Attest:

BRUCE LEHMAN

*Attesting Officer*      *Commissioner of Patents and Trademarks*